United States Patent
Fripp et al.

(10) Patent No.: US 12,203,333 B2
(45) Date of Patent: Jan. 21, 2025

(54) COMPOSITE WELLBORE SEALING DEVICE

(71) Applicant: Halliburton Energy Services, Inc., Houston, TX (US)

(72) Inventors: Michael Linley Fripp, Singapore (SG); Atharv Abhijit Naik, Singapore (SG); Muhammad Nur Adli Juhari, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 88 days.

(21) Appl. No.: 17/833,575

(22) Filed: Jun. 6, 2022

(65) Prior Publication Data

US 2023/0392468 A1   Dec. 7, 2023

(51) Int. Cl.
| | |
|---|---|
| *E21B 33/12* | (2006.01) |
| *B29C 70/38* | (2006.01) |
| *B29C 70/48* | (2006.01) |
| *E21B 33/129* | (2006.01) |
| *B29C 70/46* | (2006.01) |
| *B29L 31/26* | (2006.01) |

(52) U.S. Cl.
CPC ........ *E21B 33/1208* (2013.01); *B29C 70/382* (2013.01); *E21B 33/1293* (2013.01); *B29C 70/386* (2013.01); *B29C 70/462* (2013.01); *B29L 2031/26* (2013.01)

(58) Field of Classification Search
CPC ... B29C 70/382; B29C 70/386; B29C 70/462; E21B 33/1309; E21B 33/1293
See application file for complete search history.

(56) References Cited

U.S. PATENT DOCUMENTS

| | | | | |
|---|---|---|---|---|
| 3,783,060 | A * | 1/1974 | Goldsworthy | ........... B07C 1/025 156/169 |
| 4,071,599 | A * | 1/1978 | Walker | .................. B29C 70/326 264/269 |
| 4,614,346 | A * | 9/1986 | Ito | ....................... E21B 33/1277 166/187 |
| 4,842,684 | A * | 6/1989 | Tillement | .............. B29C 70/382 156/247 |

(Continued)

OTHER PUBLICATIONS

Taheri-Behrooz, F., R.A. Esmaeel, F. Taheri, Response of perforated composite tubes subjected to axial compressive loading, Thin-Walled Structures, vol. 50 (2012), pp. 174-181. (Year: 2012).*

(Continued)

*Primary Examiner* — Matthew J Daniels
(74) *Attorney, Agent, or Firm* — Scott Richardson; C. Tumey Law Group PLLC

(57) ABSTRACT

A wellbore sealing device may be designed and manufactured using computer-assisted design and a hybrid of automated manufacturing and molding techniques. In one example, a stress analysis is performed to identify a reinforcement region to be reinforced in a sealing device component. Reinforcement fibers are selectively arranged using automated placement of the fibers in a location within a mold corresponding to the reinforcement region. The sealing device component is then molded, with the reinforcement fibers embedded in a matrix material locking the reinforcement fibers in position within the reinforcement region.

16 Claims, 5 Drawing Sheets

(56) References Cited

U.S. PATENT DOCUMENTS

| | | | | |
|---|---|---|---|---|
| 5,507,346 | A * | 4/1996 | Gano | F16L 9/16 |
| | | | | 166/242.1 |
| 6,510,961 | B1 * | 1/2003 | Head | B29C 53/587 |
| | | | | 244/119 |
| 6,722,427 | B2 * | 4/2004 | Gano | E21B 43/105 |
| | | | | 166/207 |
| 6,808,024 | B2 * | 10/2004 | Schwendemann | E21B 17/203 |
| | | | | 166/387 |
| 7,093,664 | B2 | 8/2006 | Todd et al. | |
| 7,108,821 | B2 * | 9/2006 | Tartar | B29C 41/04 |
| | | | | 264/270 |
| 7,735,549 | B1 * | 6/2010 | Nish | E21B 33/1293 |
| | | | | 166/134 |
| 10,807,319 | B2 | 10/2020 | Escowitz | |
| 2003/0151171 | A1 * | 8/2003 | LeBreton | F16J 12/00 |
| | | | | 264/102 |
| 2004/0051214 | A1 * | 3/2004 | Sheu | B29C 70/443 |
| | | | | 264/511 |
| 2005/0039844 | A1 * | 2/2005 | Engwall | B29C 53/72 |
| | | | | 156/429 |
| 2007/0089877 | A1 * | 4/2007 | Corre | E21B 33/1277 |
| | | | | 166/187 |
| 2007/0193736 | A1 * | 8/2007 | Corre | F16J 15/068 |
| | | | | 166/387 |
| 2008/0217063 | A1 * | 9/2008 | Moore | E21B 17/1042 |
| | | | | 175/57 |
| 2011/0012282 | A1 * | 1/2011 | Dagher | B29C 70/446 |
| | | | | 264/102 |
| 2015/0047842 | A1 * | 2/2015 | Hoskins | E21B 33/10 |
| | | | | 166/185 |
| 2015/0198008 | A1 | 7/2015 | Smith et al. | |
| 2015/0308216 | A1 | 10/2015 | Wiggins et al. | |
| 2017/0314359 | A1 | 11/2017 | Fripp et al. | |
| 2018/0087350 | A1 * | 3/2018 | Sherman | C08K 3/08 |
| 2018/0345605 | A1 * | 12/2018 | Escowitz | B29C 70/0035 |
| 2019/0136658 | A1 | 5/2019 | Rochen et al. | |
| 2019/0218873 | A1 | 7/2019 | Davis et al. | |
| 2019/0352999 | A1 | 11/2019 | Greenlee et al. | |
| 2020/0369552 | A1 | 11/2020 | Davison et al. | |
| 2021/0054704 | A1 | 2/2021 | Merron et al. | |
| 2021/0054719 | A1 | 2/2021 | Nichols et al. | |
| 2021/0363854 | A1 | 11/2021 | Tu et al. | |
| 2022/0034192 | A1 | 2/2022 | Harris et al. | |

OTHER PUBLICATIONS

Halliburton, Fas Drill Ultra Frac Plug, Improved pump down efficiency and reduced millouttimes, H012490, Jul. 2019.
Halliburton, Fas Drill Ultra Frac Plugs Reduct Time and Difficulty of Millout Operations, H012640, Aug. 2017.
International Search Report and Written Opinion for International Patent Application No. PCT/US2022/033454 dated Mar. 2, 2023.

* cited by examiner

COMPOSITE WELLBORE SEALING DEVICE

BACKGROUND

Wellbores are drilled into the earth for a variety of purposes including accessing hydrocarbon bearing formations. A variety of downhole tools may be used within a wellbore in connection with accessing and extracting such hydrocarbons. Throughout the process, it may become necessary to isolate sections of the wellbore in order to create pressure zones. Wellbore sealing devices, such as frac plugs, bridge plugs, packers, and other suitable tools, may be used to isolate wellbore sections.

Frac plugs and other wellbore sealing devices are commonly run into the wellbore on a conveyance such as a wireline, work string, or production tubing. Such tools typically have either an internal or external setting tool, which is used to set the downhole tool within the wellbore and hold the tool in place. Upon reaching a desired location within the wellbore, the downhole tool is actuated by hydraulic, mechanical, electrical, or electromechanical means to seal off the flow of liquid around the downhole tool. After a treatment operation, wellbore sealing devices may be removed from the wellbore by various methods, including dissolution and/or drilling.

BRIEF DESCRIPTION OF THE DRAWINGS

These drawings illustrate certain aspects of some of the embodiments of the present disclosure and should not be used to limit or define the method.

DETAILED DESCRIPTION

A composite wellbore sealing device has reinforcement fibers selectively arranged to optimize performance while allowing the device to be readily drilled out or destroyed at the end of its service life. Computer-aided stress analysis may be used to design one or more component of the wellbore sealing device, including the arrangement of the reinforcement fibers. A hybrid of automated manufacturing tools (e.g., additive manufacturing) and molding techniques may then be used to form the sealing device component(s). For example, a stress analysis may be performed on a virtual model to identify one or more reinforcement regions of a sealing device component at which to arrange elongate reinforcement fibers. Aspects of additive manufacturing may then be used to control the placement of the elongate fibers prior in a mold, prior to molding the part to lock the fibers into their arranged orientation. The wellbore sealing device or components thereof may be designed and manufactured with preferential failure zones in which reinforcement fibers are omitted, reduced, or otherwise arranged to promote a preferred failure mode. The preferential failure zones are more susceptible, by design, to being drilled out, dissolved, or otherwise intentionally failed at the end of the service life.

In one example, a method of forming a wellbore sealing device is provided. The method includes performing a stress analysis of a sealing device component to be formed to identify a reinforcement region to be reinforced. The reinforcement region may be a region of higher stress or strain. An arrangement of reinforcement fibers may be designed to improve the structural integrity of the device while including preferential failure zones that can be readily drilled, dissolved, or otherwise failed. The mold defines a net shape for the sealing device component to be formed. Reinforcement fibers may be selectively arranged at a location within a mold corresponding to the reinforcement region. A matrix material may be supplied to the mold and the sealing device component may be molded with the reinforcement fibers embedded in the matrix material at the reinforcement region(s).

In one aspect, placement of the fibers can be automated using an additive manufacturing machine, a robot, computer numerical controls, etc., or by hand. The fibers are placed in customized locations according to the design. The reinforcement fibers may comprise single fibers, bundles of fibers, braids of fibers, or tapes of fibers. Unlike chopped composites or filament wound composites, the continuous fiber composite features bends in the fiber in the planar direction, or in a cylindrical coordinate surface. In some configurations, a build angle of the fiber bends can be at the rate of 90 degrees per 1 mm to 90 degrees per 50 mm and potentially up to 90 degrees per 200 mm.

Figure 1:
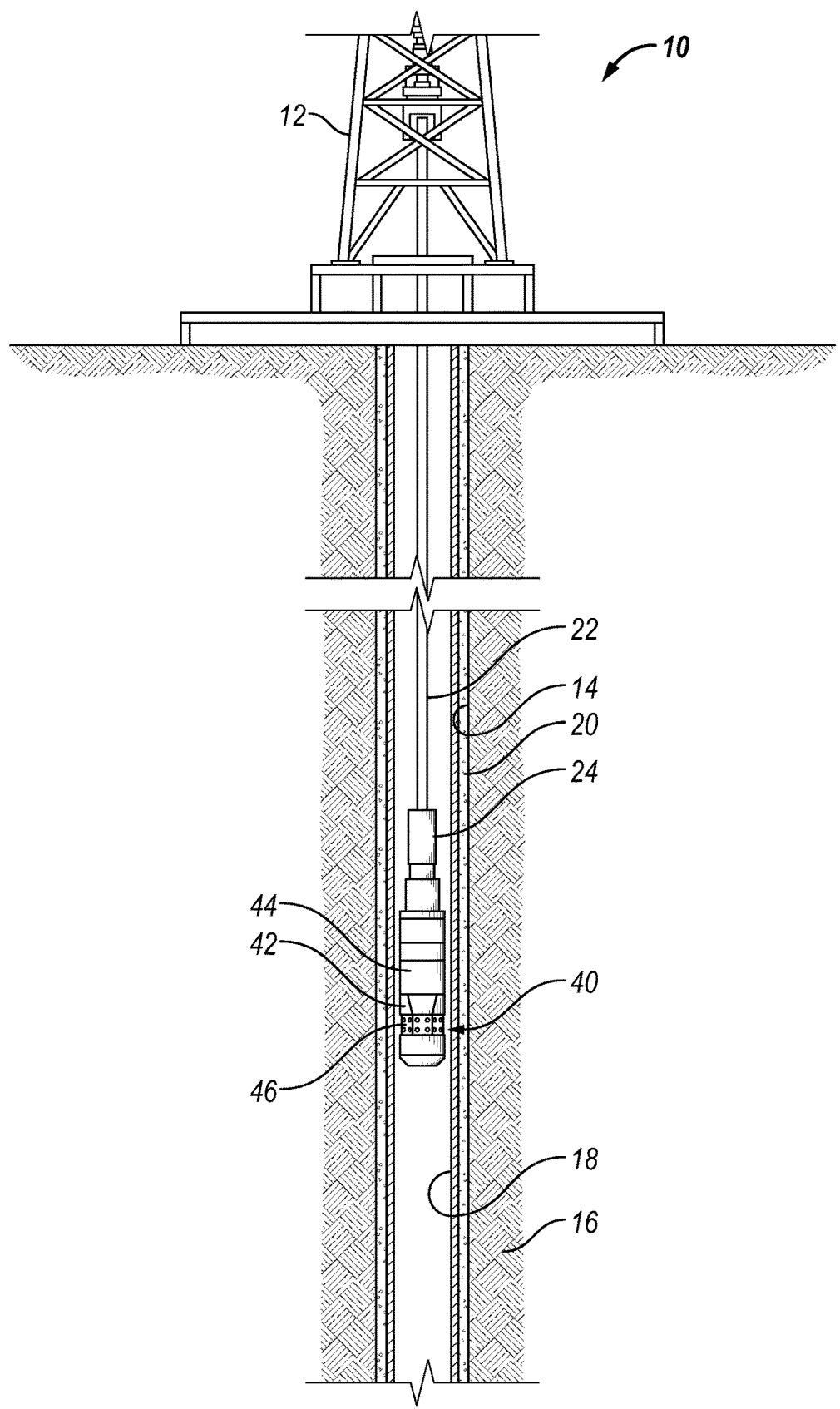
FIG. 1 is an elevation view of a representative well site in which a wellbore sealing device may be used according to aspects of the present disclosure.

FIG. 1 is an elevation view of a representative well site 10 in which a wellbore sealing device 40 may be used according to aspects of the present disclosure. The well site 10 is simplified for discussion purposes and is not to scale. While FIG. 1 generally depicts a land-based operation, those skilled in the art would readily recognize that the principles described herein are equally applicable to operations that employ floating or sea-based platforms and rigs, without departing from the scope of the disclosure. A service rig 12 extends over and around a wellbore 14. The service rig 12 may comprise a drilling rig, a completion rig, a workover rig, or the like. In some embodiments, the service rig 12 may be omitted and replaced with a standard surface wellhead completion or installation, without departing from the scope of the disclosure. The wellbore 14 has been drilled into a subterranean formation 16 and lined with a casing 18 held into place by cement 20. In some embodiments, the wellbore casing 18 may be omitted from all or a portion of the wellbore 14 and the principles of the present disclosure may alternatively apply to an "open-hole" environment. Although shown as vertical, directional drilling techniques may be applied such that the wellbore 14 includes any number of horizontal, vertical, slant, curved, and other types of wellbore 14 geometries and orientations.

A wellbore sealing device 40 and setting tool 24 are depicted being lowered into the wellbore 14 on a conveyance 22 that extends from the service rig 12. The conveyance 22 may include any suitable apparatus for conveying wellbore sealing device into a wellbore, including but not limited to be a tubing string, coiled tubing, wireline, slickline, or the like. The conveyance 22 may include conduit for conveying fluids and/or electrical transmission lines for conveying electrical power and/or data signals. The conveyance 22, the wellbore sealing device 40, and optionally other tools supported on the conveyance 22 may be collectively referred to as a work string or tool string. In other configurations, instead of using a conveyance, the wellbore sealing device 40 may be pumped to location as an untethered device.

The wellbore sealing device 40 and the setting tool 24 may be lowered into the wellbore 14 to a target location. Upon reaching the target location, the wellbore sealing device 40 may be actuated or "set" and thereby provide a point of fluid isolation within the wellbore 14. The wellbore sealing device 40 includes a sealing element 44 and other sealing device components coupled to a tubular tool body 42. For example, an anchoring assembly 46 may include one or more fiber-reinforced slips or other sealing device components according to this disclosure, with wedges may to urge the slip radially outwardly. A setting tool 24 may be included in the tool string to set the wellbore sealing device 40 at the target location. Setting the wellbore sealing device 40 may comprise using the setting tool 24 to urge the sealing element 44 outwardly into sealing engagement with the wellbore 14 and urging the slips of the anchoring assembly 46 outwardly into gripping engagement with the casing 18 to anchor the wellbore sealing device 40 to the casing 18 at the target location.

The wellbore sealing device 40 of FIG. 1 is depicted in a run-in-hole (RIH) or unset condition. In the RIH/unset configuration, the wellbore sealing device 40 can be moved uphole or downhole without catching on the casing 18 of the wellbore 14. Once the wellbore sealing device 40 reaches the desired location, the setting tool 24 may be actuated to set the wellbore sealing device 40, anchoring it into place and moving it into a sealing engagement. It should be noted that, while one wellbore sealing device 40 is shown, a plurality of wellbore sealing devices 40 may be placed in the wellbore 14, optionally on the same conveyance 22. In some embodiments, for example, two or more wellbore sealing devices 40 may be arranged on the conveyance 22 at a desired spacing to divide the wellbore 14 into smaller intervals or "zones" for a particular operation (e.g., hydraulic stimulation). Multiple wellbore sealing devices 40 may be set individually or as a group, depending on the configuration.

Figure 2:
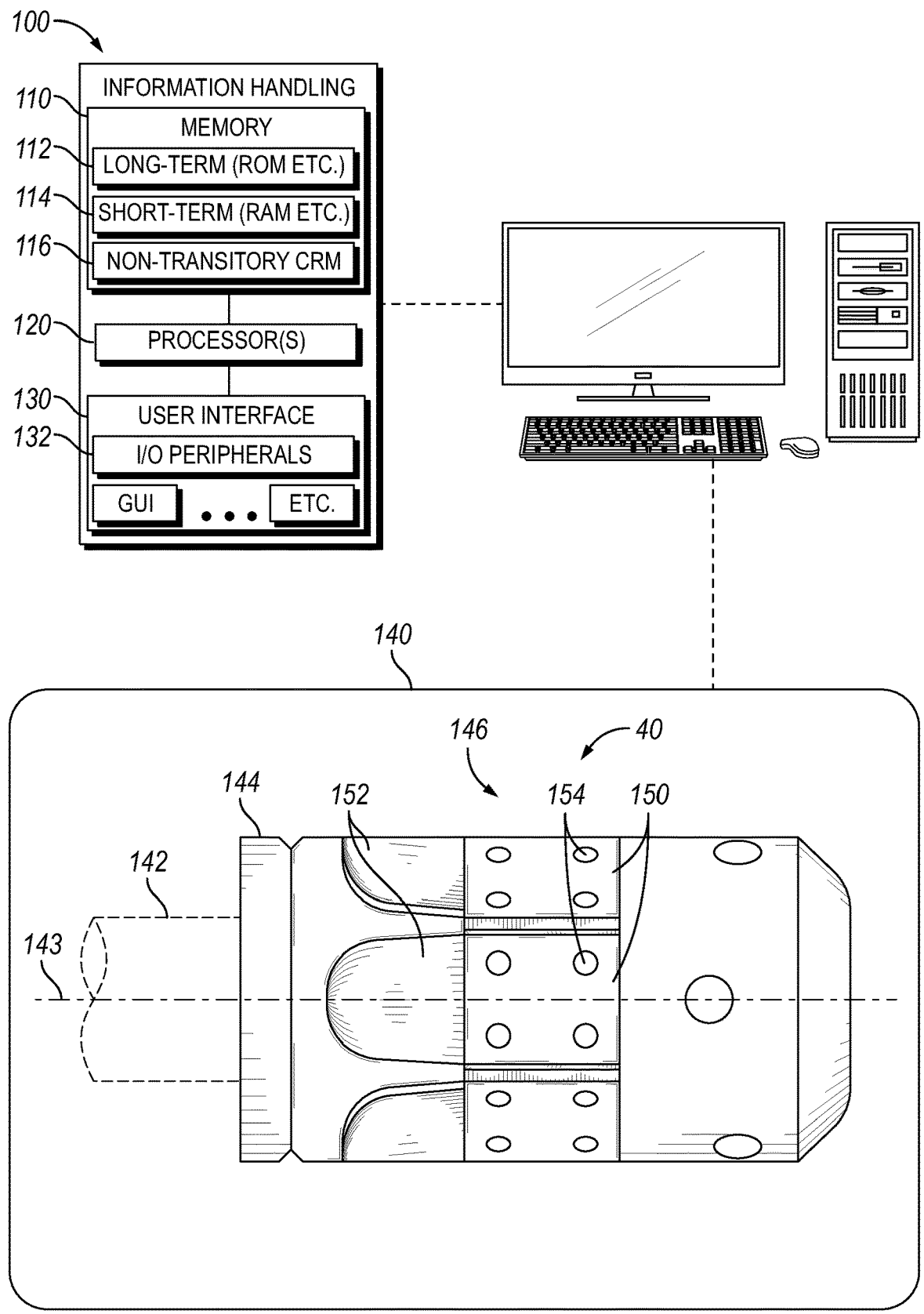
FIG. 2 is a schematic diagram of an information handling system for designing, analyzing, and/or controlling the manufacture of a downhole tool to be formed.

FIG. 2 is a schematic diagram of an information handling system 100 for designing and optionally manufacturing the wellbore sealing device 40 as an example of a downhole tool to be formed. A design for the wellbore sealing device 40 to be formed is represented as a tool model 140. The tool model 140 may include a virtual representation for each of various sealing device components, such as a sealing element 144 and an anchoring assembly 146. The anchoring assembly 146 may include virtual representations, for example, for a plurality of slips 150 circumferentially-arranged around a tool body 142. The slips 150 may be slidable, such as in an axial direction along corresponding ramped surfaces 152, which may be defined by the tool body 142 or another tool component such as wedges. The slips 150 may include a plurality of gripping inserts 154, i.e., buttons. The inserts 154 may be hardened inserts in the slips 150 designed to bite into relatively softer material of a casing or other tubular in which a sealing device, manufactured according to a design of the tool model 140, is disposed.

The overall structure of the wellbore sealing device represented by the tool model 140 has a round shape defining a central axis 143, to conform to a wellbore in which the manufactured wellbore sealing device will be disposed. Accordingly, components of the wellbore sealing device, including the tool body 142, the sealing element 144, and the slips 150, may have a generally arcuate shape around the central axis 143. In the design and stress analysis of the components, a polar/cylindrical coordinate system may therefore be defined with respect to the generally circular cross-sectional shape, with the central axis 143 coinciding with the polar axis of that coordinate system.

The information handling system 100 may be used to gather, store, process, communicate, and analyze data from various parameters of (e.g., inputs) to design, analyze, and/or manufacture the wellbore sealing device or other downhole tool according to aspects of the tool model 140. These parameters may include design parameters for the tool model 140, which may comprise a computer-generated model representative of the actual wellbore sealing device to be formed. Design inputs may include aspects such as dimensional information, materials, and mechanical properties of the tool to be formed. The inputs to the information handling system 100 may also include inputs representative of how the tool model 140 would be mechanically loaded in service so that a stress analysis may be obtained indicating mechanical stress(es), strains, and other effects at one or more locations in the tool.

The schematically-drawn information handling system 100 may be embodied in the form of any general or special-purpose computer system of any type. It may include various information handling components, which may or may not include distributed or spatially separated components, e.g., one or more desktop, laptop, or server modules connected over a network or other suitable electronic communication medium. Thus, processing, storing, and/or analyzing of information may occur at different locations and times. Representative components of the information handling system 100 include memory 110, one or more processor 120, and a user interface 130. Memory 110 may comprise any of a variety of electronic memory devices, such as one or more long-term storage device 112, one or more short-term storage device 114, and a non-transitory computer-readable medium (CRM) 116. Long-term memory may be structured, for example, as read only memory (ROM), which is a type of non-volatile memory for which data is not readily modified after the manufacture of the memory device. Short-term memory 114 may be structured, for example, as random access memory (RAM), which in contrast to ROM or Flash, can be read and changed. For example, short-term memory may be used to temporarily store information such as computer executable instruction code (e.g., from software) and/or data from sensors 410, 420 for processing by the processor 120. The non-transitory CRM 116 may comprise a device or structure on which computer executable instructions, data, and other information may be stored in a non-transitory manner. The processor 120 may include a microprocessor or other suitable circuitry for processing information. The user interface 130 generally comprises one or more devices electronically connected or connectable to other components of the information handling system 100 for communicating information from or to a user (typically, a human user). The user interface 130 may include input/output (I/O) peripherals 132. Examples of peripherals for user input include a keyboard, mouse, stylus, track pad, touchscreen, smart goggles or glasses, a microphone, and biometric (e.g. fingerprint, retina, or facial recognition) sensors. Examples of peripherals that provide output for a user include a video display, a speaker, a printer or other imaging device, a tactile feedback device, and smart goggles or glasses. Some of these peripherals provide both user input and user output.

The information handling system 100 described above can represent any of a broad range of different computer system configurations, which may be embodied as more than one different special purpose computer system. The information handling system 100 or particular configurations thereof may be used for designing the tool model 140, for performing a stress analysis on the tool model 140, and/or for controlling the manufacture of a physical wellbore sealing device or other tool represented by the tool model 140.

The information handling system 100 may be used in both the design and stress analysis of the tool model 140. The stress analysis may be representative of how the wellbore sealing device represented by the tool model 140 is expected to behave under various loading inputs and other parameters. The stress analysis may include one or more stress values at different locations of the tool model 140 including one or more stress values at different locations of specific device components. The stress analysis may include quantitative or qualitative identification of one or more higher-stress region and one or more lower-stress region.

The design and stress analysis may be related, in that a design affects the stress analysis and the stress analysis informs the design. Thus, a design process may be iterative, such as by obtaining initial design parameters, computing a stress analysis for the tool model 140 based on the initial design parameters, and computing one or adjusted design parameters based on the stress analysis. The stress analysis for a given design iteration may inform a next design iteration until a desired result is achieve for given optimization criteria (e.g., strength, durability, cost, and drillability). As further discussed below, design of the tool model 140 may include strategic placement of reinforcement fibers according to the stress analysis. For example, the information handling system 100 may be used to identify one or more regions for fiber-reinforcement (i.e., reinforcement region) and for determining a particular positioning (e.g. orientation, location, and/or path) of reinforcement fibers to be arranged in the reinforcement region, based at least in part on the stress analysis.

Figure 3:
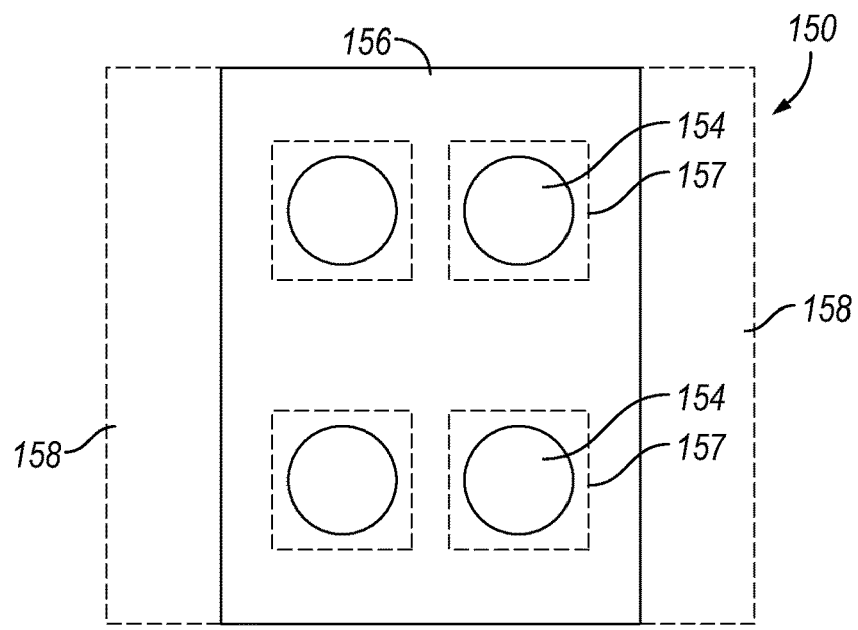
FIG. 3 is a schematic view depicting one of the slips in an unreinforced condition.

FIG. 3 is a schematic view depicting one of the slips 150 in an unreinforced condition. The slip 150 may represent, for example, a computer model or a test specimen of a design, such as a first iteration of the design without any reinforcement fibers. A stress analysis may be performed on the slip 150 to identify a variation in mechanical stress and/or stress-related parameters (e.g., strain) in the slip 150. Based on the stress analysis, one or more regions may be identified for reinforcement (or increased reinforcement) with reinforcement fibers. For example, a region with higher-stress or strain may be identified for increased reinforcement, while lower-stress or lower strain regions can be identified for omitting or reducing reinforcement. For discussion purposes, the present example selects a higher-stress region as the reinforcement region, and a lower-stress region for reducing or omitting such reinforcement. However, a reinforcement region may be selected by other, stress-related values such as strain. For example, a region having greater strain than another region, absent reinforcement, may be selected as the reinforcement region.

The stress analysis may include qualitatively determining a higher-stress region and a lower-stress region relative to the higher-stress region. The stress analysis may also include quantitative aspects, such as by calculating numerical stress values directly or by proxy using stress-dependent calculations like strain calculations. The stress analysis may include computer modeling with actual stress values and/or a distribution of stress values or stress-related values (e.g., strain) in different locations of the slip 150. The expected stress or stress-related values may be computed at different locations in the slip 150 to determine one or more higher-stress region and one or more lower-stress region.

The higher-stress and lower-stress regions may be determined using comparable stresses in terms of stress type and orientation. For example, tensile or shear stress values of a particular orientation and location in one region may be compared, respectively, with tensile or shear stress values of the same orientation in corresponding locations of another region, to determine which region is higher-stress or lower-stress, relatively speaking. A higher-stress region may be identified, for example, as a region that has a net stress that is larger than a net stress in another region, as a region whose average stress is larger than an average stress in another region, or a region whose lowest stress value is greater than a highest stress value of another region. In other examples, a reinforcement region may be identified using strain values and not necessarily stress values, since strain may be dependent not only on stress but on other, structural parameters affecting stiffness such as a cross-sectional thickness or shape. In at least some examples, a higher-stress region may specifically be identified as a region where the stress in the material exceeds a stress threshold, such as the yield stress of the material, the ultimate stress of the material, or a fraction of the yield stress (such as 90% of yield), and a low stress may specifically be identified as a region where the stress does not exceed that stress threshold In FIG. 3, a reinforcement region comprises a higher-stress region 156 in the vicinity of the inserts 154. The stress values may be greater about the inserts 154 because of the reliance on large radial forces for gripping engagement with a tubular. Two lower-stress regions 158 have been identified on either side of the higher-stress region 156. In this case, the lower-stress regions 158 are contiguous with the higher-stress region 156, although in other cases a lower-stress region may be identified that is spaced from the higher-stress region 156. The higher-stress region 156, itself, may include a plurality of non-contiguous portions 157, which in this example are each a region about a respective one of the inserts 154, which may include mounting locations of the inserts 154 on the slip 150. These higher-stress region(s) and lower-stress regions may be determined by the stress analysis such as discussed with reference to FIG. 2.

Figure 4:
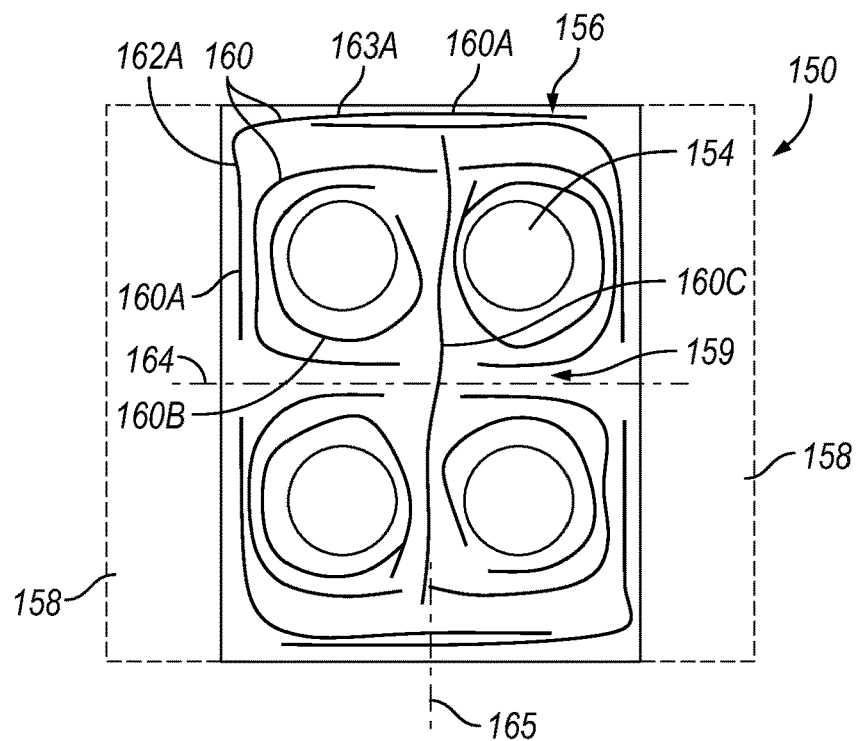
FIG. 4 is a schematic diagram of the slip with reinforcement fibers selectively arranged in the higher-stress region identified as a result of the stress analysis of FIG. 3.

FIG. 4 is a schematic diagram of the slip 150 with reinforcement fibers 160 selectively arranged in the higher-stress region 156 identified as a result of the stress analysis of FIG. 3. FIG. 4 may represent a subsequent iteration of the design of the slip 150 embodied as a component of the tool model 140 of FIG. 2. The reinforcement fibers 160 are arranged in the higher-stress region 156. In particular, in this example, the fibers 160 are arranged at different radial spacings from the nearest insert 154. Each fiber 160 may overlap with one or more other fibers. The individual fibers 160 are also arranged along non-linear paths. The non-linear path in this context is separate from the curved path a fiber may make to follow an arcuate shape of a sealing device component around a central axis of the wellbore sealing device. For context, a conventional, filament-wound composite that follow a spiral shape about a cylindrical mandrel axis would be straight if the cylindrical coordinate surface were laid flat. By comparison, the individual fibers 160 in FIG. 4 each have a non-linear path within a cylindrical coordinate system, wherein the slip defines a cylindrical coordinate surface on which the fibers 160 are arranged. Thus, even with the shape of the slip 150 being laid out "flat"

(e.g., if FIG. 4 were a flat-pattern of the slip), each of the fibers 160 is oriented with a non-linear path in that plane.

The fibers 160 are elongate, having sufficient length to conform to a non-linear path as arranged prior to molding. If too short, a fiber may behave more like the randomly oriented short fibers known as "whiskers" that are sometimes used in conventional composites. By comparison, each fiber 160 in FIG. 4 is deliberately oriented and has sufficient length to conform to a desired non-linear path. In this example, the non-linear path allows the fibers 160 to conform around the generally circular shape of the nearest insert 154 and to stay without the outer bounds of the slip 150.

The curved path of each fiber 160 may be described in terms of a build angle, which may vary along the length of that fiber 160. For example, one fiber 160A radially spaced from the insert 154 has a straight section 161A (i.e., an essentially zero build angle along the straight section 161A) along one edge of the slip 150, followed by a 90-degree curve 162A near a corner of the slip 150, and then another straight section 163A along an adjacent edge of the slip 150. Another example fiber 160B radially inward of the first example fiber 160A, by comparison, has a continuous curve (substantially constant build angle) along its length. The build angle of any given fiber, which may be variable, may described in terms of degrees per unit length, e.g., degrees per millimeter (mm). In some configurations, the reinforcement fibers may be selectively arranged in a higher-stress region with a build angle of between 90 degrees per millimeter and 90 degrees per 200 millimeters along the non-linear path.

The reinforcement may be determined and controlled throughout the slip 150 according to objective metrics such as a volume percentage of fibers or a percentage of total stiffening (e.g., reduction in strain for a given stress value). The fibers 160 may be arranged with a varying density or orientation in multiple layers. The layers may extend generally parallel to the plane of the drawing page in FIG. 4. Thus, FIG. 4 may show fibers 160 in just one layer, with one or more other layers spaced at a depth (into the page) from the layer illustrated. The fibers 160 in one layer may differ in arrangement, density, and/or orientation than the fibers in another layer.

Reinforcement fibers may be reduced or omitted entirely outside of any identified reinforcement region. For example, any reinforcement fibers arranged in the lower-stress region(s) 158 may have a different density (typically, a lower density) than the reinforcement fibers 160 arranged in the higher-stress region. Any reinforcement fibers arranged in the lower-stress region(s) 158 may also have a different orientation than the reinforcement fibers 160 arranged in the higher-stress region. In this example, there are no fibers (i.e., density is zero) in the lower-stress regions 158 on opposing ends of the higher-stress region 156.

The slip design may further include a preferential failure zone to be formed outside of the higher-stress region(s). In some cases, a lower-stress region may be selected as a preferential failure zone in which reinforcement fibers are reduced or omitted to allow the slip 150 (or other device component) to be more easily failed intentionally when it is desired to remove the sealing device or other tool from the wellbore. For example, a preferential failure zone may be occupied solely by a polymeric matrix material or filler material that could be easily drilled out or dissolved. The matrix material may be the same material serving as the matrix for reinforcement fibers in the reinforcement region(s). In other cases, the preferential failure zone may include some reinforcement fibers arranged to provide some beneficial reinforcement when using a wellbore sealing device but which provide little to no reinforcement for the expected failure mode. For example, a reinforcement region 159 between pairs of inserts 154 may also be a preferential failure zone, wherein the reinforcement is reduced but not omitted. In particular, one directional fiber 160C (or, alternatively, a reduced density of directional fibers) provides limited directional reinforcement but will still allow the slip to preferentially fail on a failure plane aligned with the directional fiber 160C.

Still referring to the example of FIG. 4, the lower-stress region 159 between the pairs of inserts 154 is an example of a preferential failure zone. The higher-stress region 156 comprises the non-contiguous portions 157 (see FIG. 3) and the preferential failure zone 159 is between the two or more non-contiguous portions (the pairs of inserts 154) of the higher-stress region. The reinforcement fiber 160C extending between the pairs of inserts 154 will reinforce the slip about a horizontal bending axis 164 yet allow the slip to fail along a vertical axis 165 aligned with the fiber 160C when it is desired to break up the slip 150 to remove the sealing device from a wellbore. In other examples, discussed further below, a preferential failure zone comprises an annular portion of the wellbore sealing device aligned with a drill bit path radially inward of the high-stress region.

Figure 5:
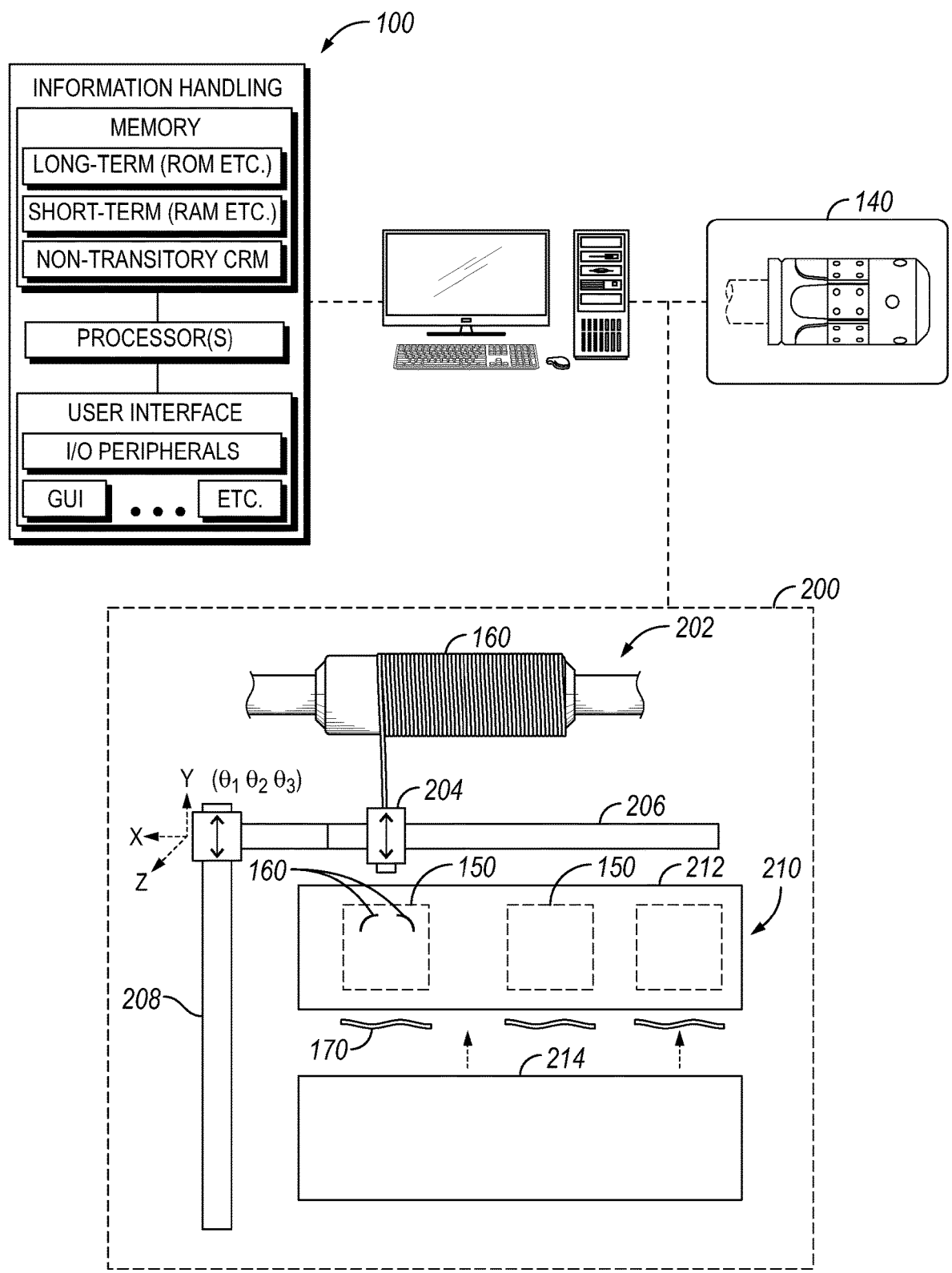
FIG. 5 is a schematic diagram of a representative manufacturing system that may be used to at least partially automate the manufacture of a reinforced tool component (e.g., a slip) according to aspects of the virtual tool.

FIG. 5 is a schematic diagram of a representative manufacturing system 200 that may be used to at least partially automate the manufacture of a reinforced tool component (e.g., a slip) according to aspects of the virtual tool 140. The manufacturing system 200 may include aspects of an additive manufacturing machine (i.e., 3D printer), computer numeric control (CNC), or other automated process controls to control the placement of individual reinforcement fibers 160. Thus, the features of FIG. 5 are schematically depicted, are not intended to limit the system 200 to any particular manufacturing system, and may represent any of a wide variety of automated manufacturing features.

The mold 210 defines a net shape for the sealing device component to be formed. The mold may include multiple mold portions 212, 214. For example, one mold portion 212 may define multiple plugs and the other mold portion 214 may define corresponding cavities of one or more slips 150, so that multiple slips 150 may be simultaneously molded for efficiency. The system 200 uses automation to selectively and precisely arrange reinforcement fibers 160 within the mold 210 corresponding to their locations and orientations as designed in the tool model 140. A polymeric matrix material 170 is then used to form a molded part reinforced by the reinforcement fibers 160 at the reinforcement locations. The resulting construction process may provide a unique hybrid of additive manufacturing (i.e., 3D printing) and molding. That is, aspects of additive manufacturing may be used to control the placement of the elongate fibers 160 that are then locked into their arranged orientation by the matrix material 170 as a result of molding. The molded sealing device component will then have a reinforced region (i.e., the region of the physical part) where the reinforcement fibers are embedded at the reinforcement region (i.e., the region identified at the design stage).

A supply of reinforcement fiber 160 is provided, which in this example is on a spool 202. The spool may comprise a long, continuous strand of the reinforcement fiber 160. The reinforcement fiber 160 may be a synthetic material such as carbon, aramid, or glass with high strength, stiffness, and/or toughness. A feeder 204 may be used to precisely feed the reinforcement fiber 160 from the spool 202 to the mold 210 and individually arrange each fiber with the desired fiber orientation. In particular, the fiber 160 may be arranged in a location within the mold 210 corresponding to the reinforcement regions, such as a particular higher-stress region. The feeder 204 may include a cutting tool (e.g., a blade or laser) to cut each fiber 160 to its length as defined in the tool model 140. The feeder 204 may be mounted on positional control equipment represented in the figure as including linear translation members 206, 208 mounted on different axes (x, y, z) and angular controls ($\theta_1$, $\theta_2$, $\theta_3$). The positional control equipment may be controlled by the information handling system 100 to arrange the reinforcement fiber 160 according to the tool model 140, such as to reinforce the higher-stress region. In at least some embodiment, the positional control equipment may be components of an additive manufacturing machine repurposed to selectively arrange the reinforcement fibers.

A matrix material 170 is supplied to the mold 210, which may give the component its net shape, bind the reinforcement fibers 160 as arranged at the reinforcement region(s), and transfer loads between fibers. The matrix material 170 may be supplied to the mold 210 in a variety of ways depending on what molding processes is used. For example, the matrix material 170 may be supplied to the mold 210 in a liquid form, such as an epoxy resin. A liquid form of the matrix material 170 may supplied to the mold 210 prior to bringing the two mold portions 212, 214 together. Alternatively, an infusion process may be used to inject a liquid form of the matrix material 170 into the mold 210 after the two mold portions 212, 214 are brought together. The fibers can also be pre-coated with some matrix material 170 as a prepreg material that is subsequently cured.

In at least one embodiment, the matrix material 170 comprises a thermoplastic binder, and the matrix material 170 is molded about the reinforcement fiber 160 using compression molding. In at least one embodiment, the matrix material 170 comprises a thermoset polymer and the matrix material 170 is molded about the reinforcement using resin transfer molding.

A pre-coated fiber may be coated with a sufficient quantity of binder that additional binder is not necessary. The fibers may be pre-coated with thermoset material or with thermoplastic material. If it is pre-coated with a thermoset, the thermoset is preferably partially cured into a B-stage. A final cure of the B-stage thermoset would include applying heat and pressure. If the fiber is coated with a thermoplastic material, then it can be heated during the placement process in order to aid bending of the fiber as well as to provide a preliminary bond between the layers of placed fibers. The fibers may also be coated with an adhesion promotor, like siloxane or silane. Similarly, a polymer binder can be added.

Figure 6:
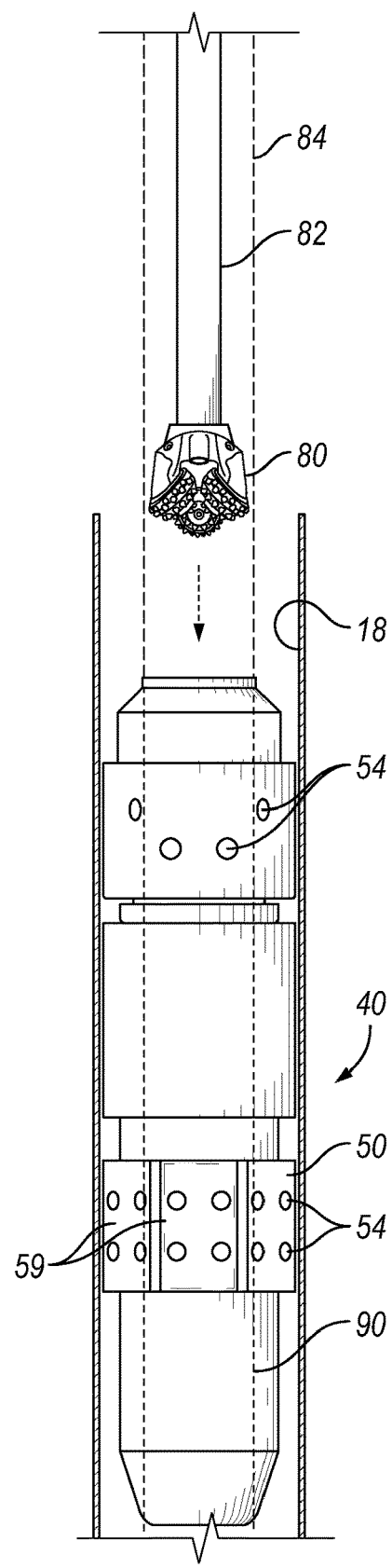
FIG. 6 is a side view of the wellbore sealing device sealingly disposed in a wellbore against a casing prior to drilling out the wellbore sealing device.

FIG. 6 is a side view of the wellbore sealing device 40 sealingly disposed in a wellbore against a casing 18 prior to drilling out the wellbore sealing device 40. The sealing device 40 includes multiple slips 50 each having been driven into gripping engagement with the casing 18. The slips 50 may be designed according to the slips 150 of the tool model 140 in the discussion of FIGS. 2-4 and formed according to the discussion of FIG. 5, for example. A drill bit 80 is disposed at the end of a drill string 82 or other conveyance. The drill bit 80 may be of a design selected for use in drilling out downhole tools. The drill bit 80 is poised for drilling along a drill bit path 84.

The sealing device 40 or at least the slips 50 thereof includes multiple preferential failure zones. One preferential failure zone is an annular failure zone 90 that comprises an annular portion of the wellbore sealing device 40 concentric and aligned with the drill bit path 84. The annular failure zone 90 is radially inward of a high-stress region in the vicinity of the inserts 54. The annular failure zone 90 of the slips 150 may be occupied solely by a polymeric matrix material or filler material that can be easily drilled out, or may be reinforced with fibers at an orientation that can be easily drilled out. Another preferential failure zone may comprise the lower-stress regions 59 between certain pairs of inserts 54. The slips 50 preferentially fail at these preferential failure zones and the high-speed and torque of the drill bit 80 during drilling may serve to break apart the slips 50 into smaller pieces along these preferential failure zones.

Accordingly, the present disclosure may provide a wellbore sealing device with fiber-reinforced sealing device components designed and manufactured using computer-assisted design and at least partially-automated manufacturing techniques. The methods/systems/compositions/tools may include any of the various features disclosed herein, including one or more of the following statements.

Statement 1. A method of forming a wellbore sealing device, the method comprising: performing a stress analysis of a sealing device component to be formed to identify a reinforcement region to be reinforced; selectively arranging reinforcement fibers in a location within a mold corresponding to the reinforcement region, wherein the mold defines a shape for the sealing device component to be formed; supplying a matrix material to the mold; and molding the sealing device component with the reinforcement fibers embedded in the matrix material at the reinforcement region.

Statement 2. The method of Statement 1, further comprising arranging the reinforcement fibers in the reinforcement region along a non-linear path within a cylindrical coordinate surface.

Statement 3. The method of Statement 2, further comprising arranging the reinforcement fibers with a build angle rate of between 90 degrees per millimeter and 90 degrees per 200 millimeters along the non-linear path.

Statement 4. The method of Statement 3, wherein the build angle of the reinforcement fibers vary along their length.

Statement 5. The method of any of Statements 1 to 4, further comprising: varying a density or an orientation of the reinforcement fibers arranged in the mold relative to a variation in stress or stress-related values from the stress analysis.

Statement 6. The method of any of Statements 1 to 5, further comprising: identifying a lower-stress region contiguous with the reinforcement region having a lower-stress or strain than the reinforcement region; and selectively arranging reinforcement fibers in a location within the mold corresponding to the lower-stress region with a different density or orientation than the reinforcement fibers arranged in the reinforcement region.

Statement 7. The method of any of Statements 1 to 6, further comprising forming a preferential failure zone of the wellbore sealing device outside of the reinforcement region by reducing or omitting reinforcement fibers in the preferential failure zone.

Statement 8. The method of Statement 7, wherein the preferential failure zone comprises an annular portion of the wellbore sealing device aligned with a drill bit path radially inward of the reinforcement region.

Statement 9. The method of Statement 8, further comprising:
sealingly disposing the wellbore sealing device in a wellbore; and
subsequently drilling out the wellbore sealing device by drilling along the drill bit path.

Statement 10. The method of Statement 7 or 8, wherein the reinforcement region comprises two or more non-contiguous portions and wherein the preferential failure zone is between the two or more non-contiguous portions of the reinforcement region.

Statement 11. The method of any of Statements 1 to 10, further comprising: using an additive manufacturing machine to selectively arrange the reinforcement fibers.

Statement 12. The method of any of Statements 1 to 11, wherein the sealing device component comprises a slip for being driven into radial engagement with the wellbore and the reinforcement region comprises one or more recesses for receiving gripping inserts for engagement with the wellbore.

Statement 13. The method of any of Statements 1 to 12, further comprising arranging different strands of the reinforcement fibers in an overlapping arrangement.

Statement 14. The method of any of Statements 1 to 13, wherein the matrix material comprises a thermoplastic binder, and wherein molding the matrix material about the reinforcement fibers comprises compression molding.

Statement 15. The method of any of Statements 1 to 14, wherein the matrix material comprises a thermoset polymer and wherein molding the matrix material about the reinforcement fibers comprises resin transfer molding.

Statement 16. A method of forming a wellbore sealing device, the method comprising: identifying a reinforcement region of a slip for being driven into radial engagement with a wellbore, the reinforcement region comprising one or more recesses for receiving gripping inserts for engagement with the wellbore; and using a computer-controlled machine to selectively arrange reinforcement fibers in a location within a mold corresponding to the reinforcement region, with some of the reinforcement fibers along a non-linear path within a cylindrical coordinate surface, the non-linear path having a build angle rate of between 90 degrees per millimeter and 90 degrees per 200 millimeters along the non-linear path; supplying a matrix material to the mold; and molding the slip with the reinforcement fibers embedded in the matrix material.

Statement 17. The wellbore sealing device of Statement 16, further comprising: forming a preferential failure zone of the wellbore sealing device outside of the reinforcement region by reducing or omitting reinforcement fibers in the preferential failure zone, wherein the preferential failure zone comprises one or both of: an annular portion radially inward of the reinforcement region for drilling out; and a region between two or more non-contiguous portions of the reinforcement region.

Statement 18. A wellbore sealing device, comprising: a plug body; a sealing device component for coupling to the plug body, the sealing device component comprising a reinforced region having reinforcement fibers and a preferential failure zone outside of the reinforcement region with reduced or omitted reinforcement fibers; and a matrix material molded about the reinforcement fibers to form the sealing device component with the reinforcement fibers embedded therein.

Statement 19. The wellbore sealing device of Statement 18, wherein the preferential failure zone comprises one or both of: an annular portion radially inward of the reinforcement region for drilling out; and a region between two or more non-contiguous portions of the reinforcement region.

Statement 20. The wellbore sealing device of Statement 18 or 19, wherein at least some of the reinforcement fibers are arranged along a non-linear path within a cylindrical coordinate surface and wherein the non-linear path comprises a build angle of between 90 degrees per millimeter and 90 degrees per 200 millimeters.

To facilitate a better understanding of the present invention, the following examples of certain aspects of some embodiments are given. In no way should the following examples be read to limit, or define, the entire scope of the disclosure.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A method of forming a wellbore sealing device, the method comprising:
   designing one or more component of the wellbore sealing device using a computer-aided stress analysis;
   selectively arranging continuous fiber composite featuring bends according to the computer-aided stress analysis as reinforcement fibers using an additive manufacturing machine in a location within a mold corresponding to a reinforcement region, wherein the mold defines a shape for the wellbore sealing device component to be formed;
   supplying a matrix material to the mold; and
   molding the wellbore sealing device component with the reinforcement fibers embedded in the matrix material at the reinforcement region.

2. The method of claim 1, further comprising arranging the reinforcement fibers in the reinforcement region along a non-linear path within a cylindrical coordinate surface.

3. The method of claim 2, further comprising arranging the reinforcement fibers with a build angle rate of between 90 degrees per millimeter and 90 degrees per 200 millimeters along the non-linear path.

4. The method of claim 3, wherein the build angle of the reinforcement fibers varies along their length.

5. The method of claim 1, further comprising:
   varying a density or an orientation of the reinforcement fibers arranged in the mold relative to a variation in stress or stress-related values from the stress analysis.

6. The method of claim 1, further comprising:
   identifying a lower-stress region contiguous with the reinforcement region having a lower-stress or strain than the reinforcement region; and
   selectively arranging reinforcement fibers in a location within the mold corresponding to the lower-stress region with a different density or orientation than the reinforcement fibers arranged in the reinforcement region.

7. The method of claim 1, further comprising forming a preferential failure zone of the wellbore sealing device outside of the reinforcement region by reducing or omitting reinforcement fibers in the preferential failure zone.

8. The method of claim 7, wherein the preferential failure zone comprises an annular portion of the wellbore sealing device aligned with a drill bit path radially inward of the reinforcement region.

9. The method of claim 7, wherein the reinforcement region comprises two or more non-contiguous portions and wherein the preferential failure zone is between the two or more non-contiguous portions of the reinforcement region.

10. The method of claim 1, wherein the sealing device component comprises a slip for being driven into radial engagement with the wellbore and the reinforcement region comprises one or more recesses for receiving gripping inserts for engagement with the wellbore; and placing gripping inserts into the one or more recesses in the reinforcement region.

11. The method of claim 1, further comprising arranging different strands of the reinforcement fibers in an overlapping arrangement.

12. The method of claim 1, wherein the matrix material comprises a thermoplastic binder, and wherein molding the matrix material about the reinforcement fibers comprises compression molding.

13. The method of claim 1, wherein the matrix material comprises a thermoset polymer and wherein molding the matrix material about the reinforcement fibers comprises resin transfer molding.

14. A method of forming a wellbore sealing device, the method comprising:
designing one or more component of the wellbore sealing device using a computer-aided stress analysis;
selectively arranging reinforcement fibers in a location within a mold corresponding to a reinforcement region, wherein the mold defines a shape for the wellbore sealing device component to be formed;
supplying a matrix material to the mold;
molding the wellbore sealing device component with the reinforcement fibers embedded in the matrix material at the reinforcement region;
forming a preferential failure zone of the wellbore sealing device outside of the reinforcement region by reducing or omitting reinforcement fibers in the preferential failure zone, wherein the preferential failure zone comprises an annular portion of the wellbore sealing device aligned with a drill bit path radially inward of the reinforcement region; further comprising:
sealingly disposing the wellbore sealing device in a wellbore; and
subsequently drilling out the wellbore sealing device by drilling along the drill bit path.

15. A method of forming a wellbore sealing device, the method comprising:
designing one or more component of the wellbore sealing device using a computer-aided stress analysis;
identifying a reinforcement region of a slip for being driven into radial engagement with a wellbore,
making the reinforcement region using an additive manufacturing machine, the reinforcement region comprising one or more recesses for receiving gripping inserts for engagement with the wellbore;
placing gripping inserts into the one or more recesses in the reinforcement region; and
using a computer-controlled machine to selectively arrange different continuous fiber composites featuring different bends according to the computer-aided stress analysis as reinforcement fibers in a location within a mold corresponding to the reinforcement region, with some of the reinforcement fibers along a non-linear path within a cylindrical coordinate surface, the non-linear path having a build angle rate of between 90 degrees per millimeter and 90 degrees per 200 millimeters along the non-linear path;
supplying a matrix material to the mold; and
molding the slip with the reinforcement fibers embedded in the matrix material.

16. The method of claim 15, further comprising:
forming a preferential failure zone of the wellbore sealing device outside of the reinforcement region by reducing or omitting reinforcement fibers in the preferential failure zone, wherein the preferential failure zone comprises at least one zone selected from the group consisting of:
an annular portion radially inward of the reinforcement region for drilling out; and
a region between two or more non-contiguous portions of the reinforcement region.

* * * * *